US007231177B2

(12) United States Patent
Walker et al.

(10) Patent No.: US 7,231,177 B2
(45) Date of Patent: Jun. 12, 2007

(54) AUDIO SYSTEM WITH FIRST AND SECOND UNITS HAVING WIRELESS INTERFACE, AND AUDIO RECIEVERS THEREFOR

(75) Inventors: Glenn A. Walker, Greentown, IN (US); John D. Funk, Galveston, IN (US)

(73) Assignee: Delphi Technologies, Inc., Troy, MI (US)

( * ) Notice: Subject to any disclaimer, the term of this patent is extended or adjusted under 35 U.S.C. 154(b) by 608 days.

(21) Appl. No.: 10/714,009

(22) Filed: Nov. 13, 2003

(65) Prior Publication Data

US 2005/0107029 A1 May 19, 2005

(51) Int. Cl.
*H04H 1/00* (2006.01)
*H04B 7/00* (2006.01)

(52) U.S. Cl. .................... 455/3.05; 455/41.2; 455/66.1

(58) Field of Classification Search ............... 455/3.01, 455/3.05, 3.06, 186.1, 45, 66.1, 344, 41.2
See application file for complete search history.

(56) References Cited

U.S. PATENT DOCUMENTS 6,148,175 A * 11/2000 Freedland .................. 455/3.06
6,757,517 B2 * 6/2004 Chang ........................ 455/3.05
6,847,802 B2 * 1/2005 Migliaccio ................... 455/45
7,065,342 B1 * 6/2006 Rolf ........................ 455/412.1
2002/0173273 A1 * 11/2002 Spurgat et al. ............... 455/66
2004/0192189 A1 * 9/2004 Yuhara et al. ............. 455/3.02

FOREIGN PATENT DOCUMENTS

EP 1 195 931 4/2002
GB 2 381 709 10/2001

OTHER PUBLICATIONS

European Search Report dated Nov. 8, 2005.

* cited by examiner

*Primary Examiner*—Tilahun Gesesse
(74) *Attorney, Agent, or Firm*—Jimmy L. Funke

(57) ABSTRACT

An audio system includes a first unit and a second unit. The first unit includes a radio frequency (RF) front-end, a channel decoder, a first wireless interface, a content decoder and a digital-to-analog converter (DAC). The second unit includes a second wireless interface, a source decoder and a content encoder.

21 Claims, 3 Drawing Sheets

AUDIO SYSTEM WITH FIRST AND SECOND UNITS HAVING WIRELESS INTERFACE, AND AUDIO RECIEVERS THEREFOR

TECHNICAL FIELD

The present invention is generally directed to an audio system receiver and, more specifically, to an audio system receiver that includes first and second units.

BACKGROUND OF THE INVENTION

Satellite digital audio radio service (SDARS) is a relatively new satellite-based service that broadcasts audio entertainment to fixed and mobile receivers within the continental United States and various other parts of the world. Within an SDARS system, satellite-based transmissions provide the primary means of communications. Today, Sirius satellite radio and XM satellite radio are two SDARS systems that are utilized to provide satellite-based services. These SDARS systems may provide separate channels of music, news, sports, ethnic, children's and talk entertainment on a subscription-based service and may provide other services, such as email and data delivery.

In these SDARS systems, program material is transmitted from a ground station to satellites in geostationary or geosynchronous orbit over the continental United States. The satellites retransmit the program material to earth-based satellite digital audio receivers. A typical satellite digital audio receiver has included an RF front-end, a channel decoder, a source decoder and a digital-to-analog converter (DAC), in addition to a human-machine interface. In SDARS systems, using satellite digital audio receivers configured in this manner, an individual that desired to listen to a satellite broadcast at different locations, for example, in a motor vehicle and in their home, has been required to have multiple satellite digital audio receivers to receive the associated satellite transmissions.

It would be desirable to provide a user of a satellite digital audio radio service with an audio system that lowers the cost of implementing multiple satellite digital audio receivers.

SUMMARY OF THE INVENTION

The present invention is directed to an audio system that includes a first unit and a second unit. The first unit includes a radio frequency (RF) front-end, a channel decoder, a wireless interface, a content decoder and a digital-to-analog converter (DAC). The RF front-end includes an input coupled to a first antenna and an output. The input of the RF front-end receives a radio signal provided by the first antenna. The channel decoder includes an input and an output, with the input of the channel decoder being coupled to the output of the RF front-end. The first wireless interface includes an input coupled to an output of the channel decoder, a first port coupled to a second antenna and a second output. The content decoder includes an input and an output with the input of the content decoder being coupled to the second output of the first wireless interface. The DAC includes an input and an output, with the input of DAC being coupled to the output of the content decoder and the output of the DAC providing an analog audio signal.

The second unit includes a second wireless interface, a source decoder and a content encoder. The second wireless interface includes a second port coupled to a third antenna, an output and a signal input and is configured to communicate with the first wireless interface. The source decoder includes an input and an output, with the input of the source decoder being coupled to the output of the second wireless interface. The content encoder includes an input and an output, with the input of the content encoder being coupled to the output of the source decoder and the output of the content encoder being coupled to a second input of the second wireless interface.

According to another embodiment of the present invention, the first and second wireless interfaces implement a BlueTooth™ protocol. According to still another embodiment of the present invention, the content encoder is an MP3 encoder and the content decoder is an MP3 decoder.

According to other embodiments of the present invention, the first and second units provide a satellite digital audio receiver system with the second unit being portable and the first unit installed with one of a motor vehicle and home stereo system. The system may also include a processor coupled to and communicating with the RF front-end, the channel decoder and the first wireless interface. The processor may communicate with the RF front-end, the channel decoder and the first wireless interface over an inter-integrated circuit ($I^2C$) bus.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
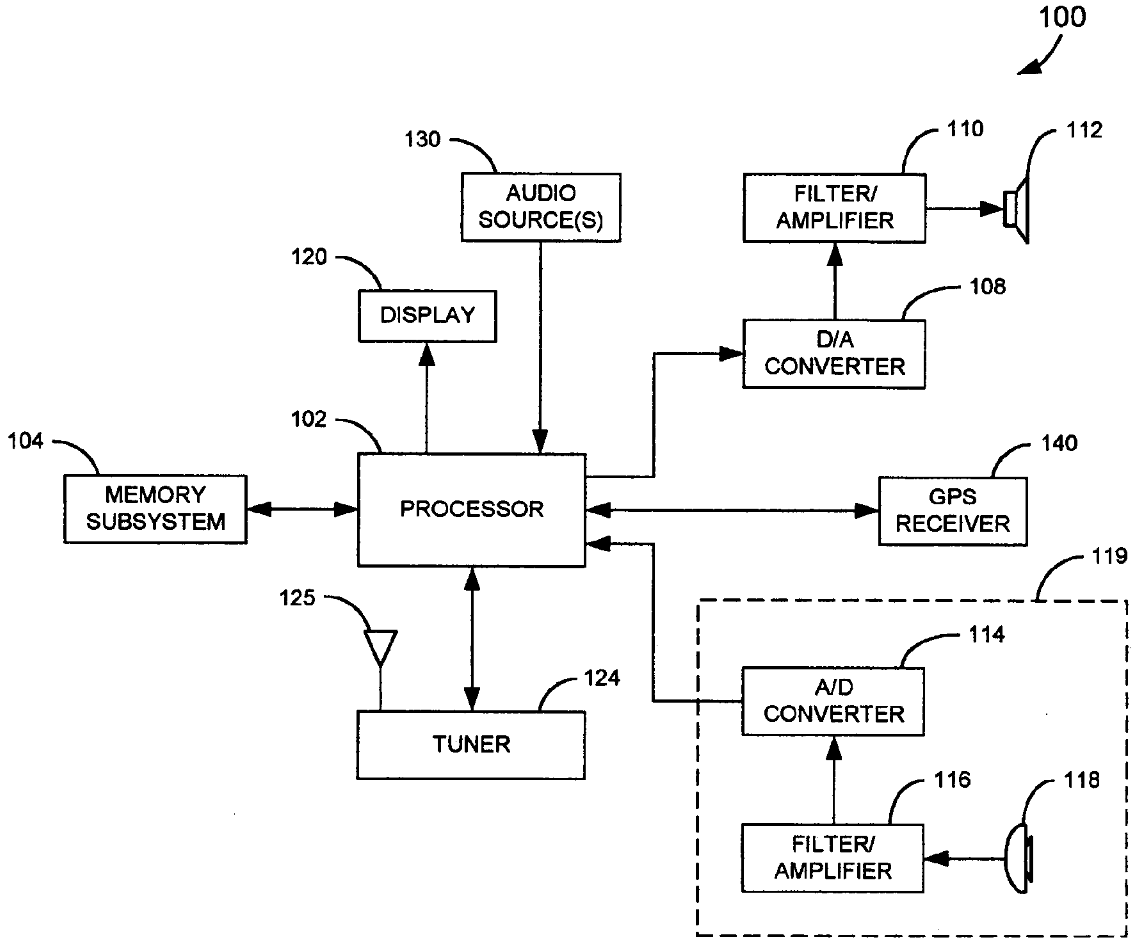
FIG. 1 depicts an exemplary electrical block diagram of an audio system implemented within a motor vehicle.

The present invention is directed to an audio system that is configured to use a common part of a receiver, for example, a satellite digital audio receiver, in multiple locations, e.g., in a fixed unit installed in a motor vehicle and a fixed unit installed in a home. The present invention has at least two distinct advantages with a first advantage being that a user is able to enjoy a lower cost of ownership for multiple installations and a second advantage being that various embodiments of the present invention eliminate the need for a hardwired interface between a portable unit and a fixed unit.

According to the present invention, a portable unit includes a source decoder and a fixed unit includes a channel decoder. According to various embodiments of the present invention, the interface between the portable unit and the fixed unit is implemented as a wireless interface. Thus, according to the present invention, a portable source decoder is implemented that functions with any other fixed unit that is compatibly configured. According to one embodiment of the present invention, an RF front-end, channel decoder, wireless interface, motion picture expert group audio layer 3 (MP3) decoder and digital-to-analog converter (DAC) are installed in a fixed unit, e.g., a motor vehicle unit and/or a home stereo unit. In this embodiment, a portable unit contains a source decoder, an MP3 encoder and a wireless interface.

The motor vehicle unit and/or the home stereo unit receives a satellite signal and performs channel decoding. This decoded channel information is then sent over a wireless link to the portable (remote) source decoder where source decryption and decoding occurs. As the output of the source decoder is a high quality audio, an MP3 compression algorithm may be implemented before retransmission of the information back to the fixed unit. The fixed unit then decodes the MP3 format and converts it from a digital format to an analog signal for driving audio amplifiers and speakers.

As mentioned above, the portable unit can be used with other similarly equipped fixed units, including portions of a satellite digital audio receiver, such that the user can utilize the portable unit with multiple fixed units, i.e., units installed in both a motor vehicle unit and a home stereo unit, without requiring additional wiring, assuming that the portable unit is battery powered. In the event that the portable unit is not battery powered, a power supply hook-up is required with the motor vehicle or with a home electrical wiring system.

Implementing a wireless link between fixed and portable units allows a user to listen to SDAR audio in his/her home or in his/her motor vehicle with the same portable unit without having to plug the device into a cradle. Thus, an audio system configured according to the present invention eliminates most or all wires (if powered from a motor vehicle or internal battery pack) and realizes significantly greater portability and reliability than previously available. That is, one portable unit can be used for both motor vehicle and home installation. Further, a portable unit can be configured to include a human-machine interface and a DAC, which couples audio output to audio headphones, and in this configuration provide a short-range wireless SDAR-type individual personal audio player.

FIG. 1 depicts a block diagram of an exemplary audio system 100 that may be implemented within a motor vehicle (not shown). As shown, the system 100 includes a processor 102 coupled to a first audio source 124, e.g., an AM/FM tuner, a second audio source 130, e.g., including a compact disk (CD) player, a digital versatile disk (DVD) player, a cassette tape player, a portion of an SDAR receiver and an MP3 file player, and a display 120. The processor 102 may control the audio sources 124 and 130, at least in part, as dictated by manual or voice input supplied by a user of the system 100. In audio systems that include voice recognition technology, different users can be distinguished from each other by, for example, a voice input or a manual input.

The processor 102 controls audio provided to a listener, via the speaker 112, and may also supply various information to a user, via the display 120 and/or the speaker 112. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). The processor 102 is also coupled to a memory subsystem 104, which includes an application appropriate amount of memory (e.g., volatile and non-volatile memory), which may provide storage for one or more speech recognition applications.

As is also shown in FIG. 1, an audio input device 118 (e.g., a microphone) is coupled to a filter/amplifier module 116. The filter/amplifier module 116 filters and amplifies the voice input provided by a user through the audio input device 118. The filter/amplifier module 116 is also coupled to an analog-to-digital (A/D) converter 114, which digitizes the voice input from the user and supplies the digitized voice to the processor 102 which may execute a speech recognition application, which causes the voice input to be compared to system recognized commands or may be used to identify a specific user. In general, the audio input device 118, the filter/amplifier module 116 and the A/D converter 114 form a voice input circuit 119.

The processor 102 may execute various routines in determining whether the voice input corresponds to a system recognized command and/or a specific operator. The processor 102 may also cause an appropriate voice output to be provided to the user through an audio output device 112. The synthesized voice output is provided by the processor 102 to a digital-to-analog (D/A) converter 108. The D/A converter 108 is coupled to a filter/amplifier section 110, which amplifies and filters the analog voice output. The amplified and filtered voice output is then provided to the audio output device 112 (e.g., a speaker). The processor 102 may also be coupled to a global position system (GPS) receiver 140, which allows the system 100 to determine the location of the receiver 140 and its associated motor vehicle.

Figure 2:
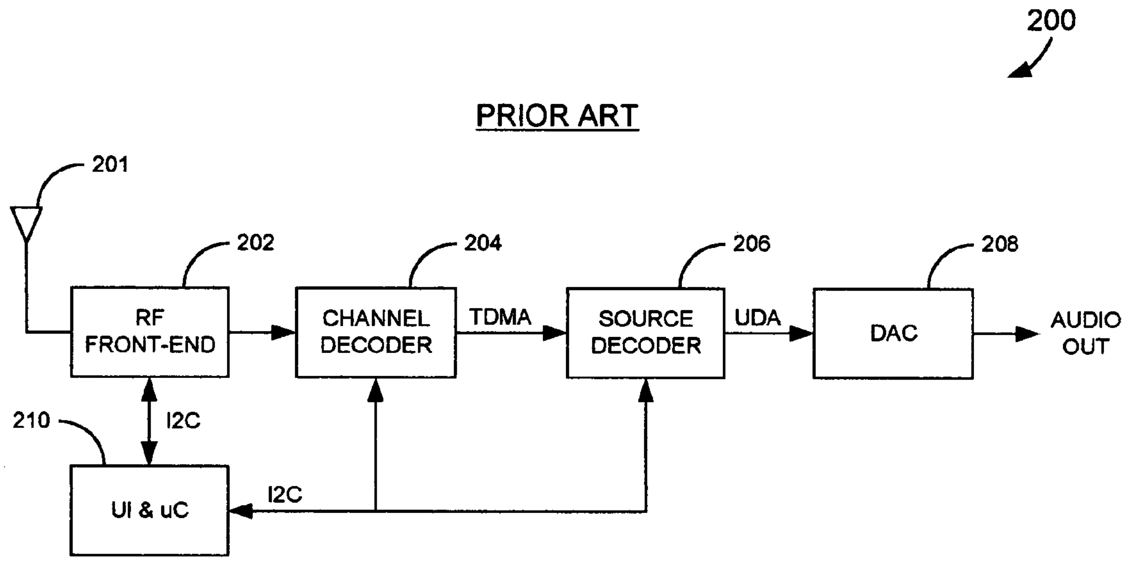
FIG. 2 depicts an exemplary electrical block diagram of a prior art satellite digital audio receiver (SDAR)

FIG. 2 depicts a typical satellite digital audio receiver 200 according to the prior art. As is illustrated in FIG. 2, an antenna 201 is coupled to an input of an RF front-end 202, whose output is coupled to an input of a channel decoder 204. The RF front-end 202 is also coupled to a microcontroller and user interface 210, via an inter-integrated circuit ($I^2C$) bus. An output of the channel decoder 204 is provided to an input of a source decoder 206, which performs decryption and provides at its output an uncompressed digital audio. The output of the source decoder 206 is coupled to a digital-to-analog converter (DAC) 208, which provides an analog audio signal at its output. As is shown in FIG. 2, the microcontroller and user interface 210 are also are also coupled, via an $I^2C$ bus, to the channel decoder 204 and the source decoder 206.

Figure 3:
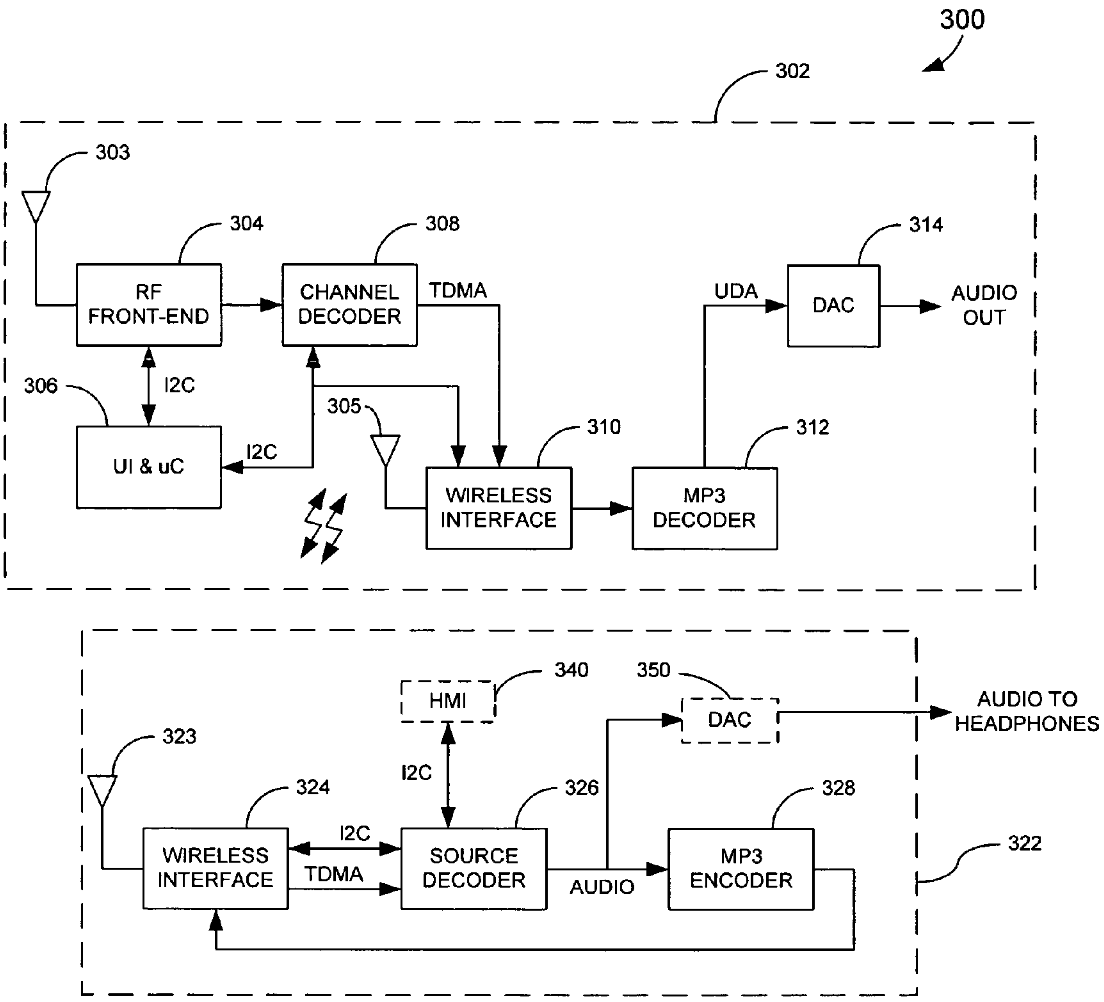
FIG. 3 depicts an exemplary electrical block diagram of an SDAR configured according to one embodiment of the present invention.

FIG. 3 depicts an audio system 300 configured according to one embodiment of the present invention. As is illustrated in FIG. 3, the audio system 300 includes a first unit 302 and a second unit 322. The first unit 302 includes in an RF front-end 304, a channel decoder 308, a wireless interface 310, a content decoder (e.g., an MP3 decoder) 312 and a digital-to-analog converter (DAC) 314, in addition to a user interface and microcontroller 306. The user interface and microcontroller 306 is coupled, via an $I^2C$ bus, to the RF front-end 304, the channel decoder 308 and the wireless interface 310.

The channel decoder 308 provides an encrypted/compressed audio/data channel to the wireless interface 310 which is transmitted to the second (remote) unit 322. The second unit 322 includes a wireless interface 324 and its associated antenna 323, a source decoder 326 and an MP3 encoder 328. The second unit 322 may also optionally include a human-machine interface 340 and a DAC 350, when the unit 322 is configured to function as a short-range wireless SDAR-type individual personal audio player. The antenna 323 is coupled to an input of the wireless interface 324, which receives the encrypted/compressed audio/data channel from the wireless interface 310, via antenna 305. The wireless interface 324 is coupled to a source decoder 326, which performs decryption of the signal provided by the wireless interface 310. The wireless interface 324 also communicates with the source decoder 326, via an $I^2C$ bus.

An output of the source decoder 326 is coupled to an input of a content encoder (e.g., an MP3 encoder) 328, which encodes the data provided by the source decoder 326 in an appropriate format, e.g., an MP3 format, and provides the information to the wireless interface 324, which then transmits the information, via the antennas 323 and 305, to the wireless interface 310. An output of the wireless interface 310 provides the encoded information to an input of the content decoder 312, which provides at its output an uncompressed digital audio to the input of the DAC 314, whose output provides an audio analog signal. The wireless interfaces 310 and 324 may implement various protocols, such as the BlueTooth™ protocol, in communicating with each other.

A wide variety of electronic components, depending upon the type of satellite system, can be utilized to provide fixed and portable units for a satellite digital audio receiver.

Accordingly, an audio system has been described herein that includes multiple units, which may include multiple fixed units that communicate with a single portable unit that performs source decoding and which allows multiple installations to be implemented at a lower cost of ownership to a specific user. Further, according to the present invention, a wireless interface is implemented between the portable and fixed units to obviate the need for a hardwired interface between the portable unit and the fixed units. Such an audio system can advantageously be implemented within an automotive environment.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An audio system, comprising:

a first unit, comprising:

a radio frequency (RF) front-end including an input coupled to a first antenna and an output, the input of the RF front-end receiving a radio signal provided by the first antenna;

a channel decoder including an input and an output, wherein the input of the channel decoder is coupled to the output of the RF front-end;

a first wireless interface including an input coupled to an output of the channel decoder and a first port coupled to a second antenna, the first wireless interface further including a second output;

a content decoder including an input and an output, wherein the input of the content decoder is coupled to the second output of the first wireless interface; and a digital-to-analog converter (DAC) including an input and an output, wherein the input of the DAC is coupled to the output of the content decoder and the output of the DAC provides an analog audio signal; and a second unit, comprising:

a second wireless interface including a second port coupled to a third antenna, an output and a signal input, wherein the second wireless interface is configured to communicate with the first wireless interface;

a source decoder including an input and an output, wherein the input of the source decoder is coupled to the output of the second wireless interface; and a content encoder including an input and an output, wherein the input of the content encoder is coupled to the output of the source decoder and the output of the content encoder is coupled to a signal input of the second wireless interface.

2. The system of claim 1, wherein the first and second wireless interfaces implement a BLUETOOTH protocol.

3. The system of claim 1, wherein the content encoder is an MP3 encoder and the content decoder is an MP3 decoder.

4. The system of claim 1, wherein the first and second units provide a satellite digital audio receiver.

5. The system of claim 1, wherein the second unit is portable.

6. The system of claim 1, wherein the first unit is installed within one of a motor vehicle and a home stereo system.

7. The system of claim 1, further comprising:

a processor coupled to and communicating with the RF front-end, the channel decoder and the first wireless interface.

8. The system of claim 7, wherein the processor communicates with the RF front-end, the channel decoder and the first wireless interface over an inter-integrated circuit bus.

9. The system of claim 1, wherein the second wireless interface communicates with the source decoder over an inter-integrated circuit bus.

10. A satellite digital audio receiver system, comprising:

a first unit, comprising:

a radio frequency (RF) front-end including an input coupled to a first antenna and an output, the input of the RF front-end receiving a radio signal provided by the first antenna;

a channel decoder including an input and an output, wherein the input of the channel decoder is coupled to the output of the RF front-end;

a first wireless interface including an input coupled to an output of the channel decoder and a first port coupled to a second antenna, the first wireless interface further including a second output;

an MP3 decoder including an input and an output, wherein the input of the MP3decoder is coupled to the second output of the first wireless interface; and a digital-to-analog converter (DAC) including an input and an output, wherein the input of the DAC is coupled to the output of the MP3 decoder and the output of the DAC provides an analog audio signal; and a second unit, comprising:

a second wireless interface including a second port coupled to a third antenna, an output and a signal input, wherein the second wireless interface is configured to communicate with the first wireless interface;

a source decoder including an input and an output, wherein the input of the source decoder is coupled to the output of the second wireless interface; and an MP3 encoder including an input and an output, wherein the input of the MP3 encoder is coupled to the output of the source decoder and the output of the MP3 encoder is coupled to a signal input of the second wireless interface.

11. The system of claim 10, wherein the first and second wireless interfaces implement a BLUETOOTH protocol.

12. The system of claim 10, wherein the second unit is portable and the first unit is installed within one of a motor vehicle and a home stereo system.

13. The system of claim 10, further comprising:

a processor coupled to and communicating with the RF front-end, the channel decoder and the first wireless interface.

14. The system of claim 13, wherein the processor communicates with the RF front-end, the channel decoder and the first wireless interface over an inter-integrated circuit bus.

15. The system of claim 10, wherein the second wireless interface communicates with the source decoder over an inter-integrated circuit bus.

16. An audio receiver unit, comprising:

a radio frequency (RF) front-end including an input coupled to a first antenna and an output, the input of the RF front-end receiving a radio signal provided by the first antenna;

a channel decoder including an input and an output, wherein the input of the channel decoder is coupled to the output of the RF front-end;

a first wireless interface including an input coupled to an output of the channel decoder and a first port coupled to a second antenna, the first wireless interface further including a second output;

a content decoder including an input and an output, wherein the input of the content decoder is coupled to the second output of the first wireless interface; and a digital-to-analog converter (DAC) including an input and an output, wherein the input of the DAC is coupled to the output of the content decoder and the output of the DAC provides an analog audio signal.

17. The unit of claim 16, wherein the wireless interface implements a BLUETOOTH protocol.

18. The unit of claim 16, wherein the content decoder is an MP3 decoder.

19. An audio receiver unit, comprising:

a wireless interface including a port coupled to an antenna, an output and a signal input;

a source decoder including an input and an output, wherein the input of the source decoder is coupled to the output of the wireless interface;

a content encoder including an input and an output, wherein the input of the content encoder is coupled to the output of the source decoder and the output of the content encoder is coupled to a signal input of the second wireless interface; and a human-machine interface (HMI) coupled to the source decoder, wherein the HMI is configured to allow an operator to change to a desired channel a digital-to-analog converter (DAC) coupled to the output of the source decoder, the DAC converting a digital audio signal associated with the desired channel to an analog audio signal for playback.

20. The unit of claim 19, wherein the wireless interface implements a BLUETOOTH protocol.

21. The unit of claim 19, wherein the content encoder is an MP3 encoder.

* * * * *